No. 858,903. PATENTED JULY 2, 1907.
H. OLDHAM.
LATH CUTTER.
APPLICATION FILED MAR. 1, 1907.
2 SHEETS—SHEET 1.
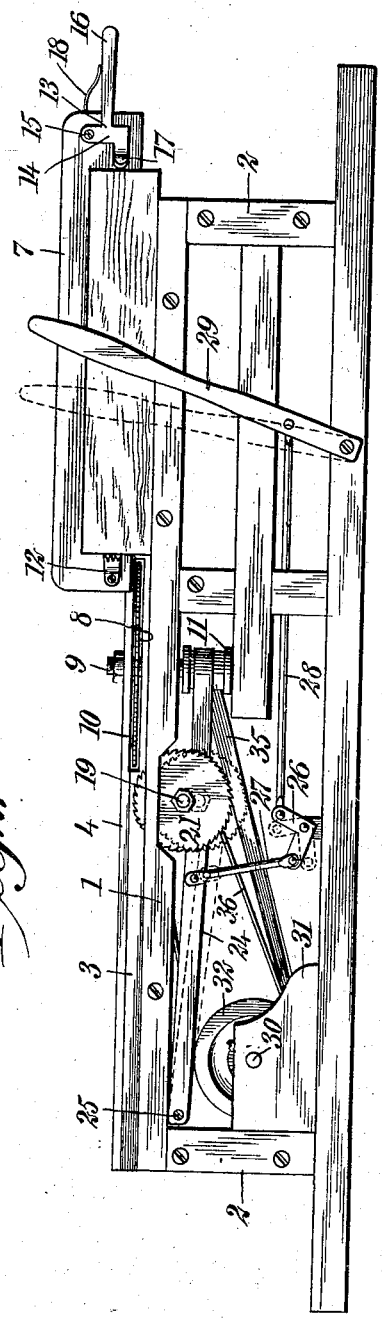
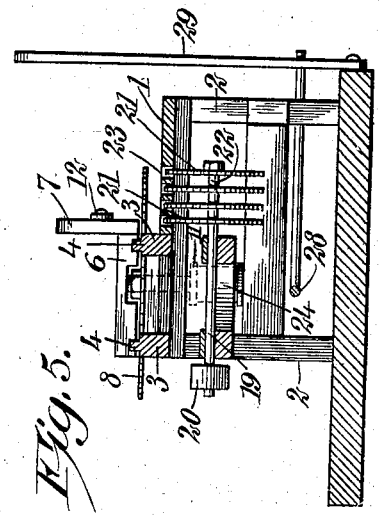
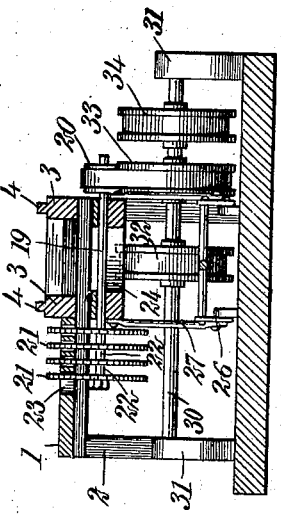
WITNESSES
INVENTOR
Herschel Oldham
BY
ATTORNEYS No. 858,903.
PATENTED JULY 2, 1907.
H. OLDHAM.
LATH CUTTER.
APPLICATION FILED MAR. 1, 1907.
2 SHEETS—SHEET 2.
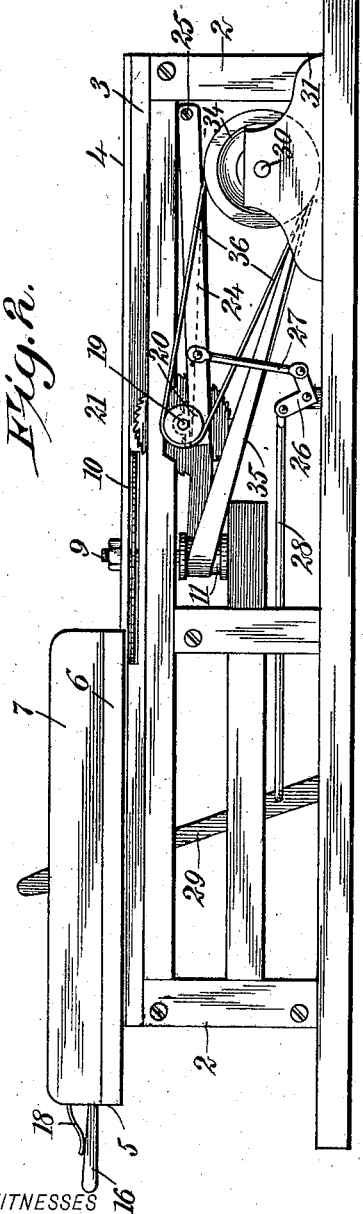
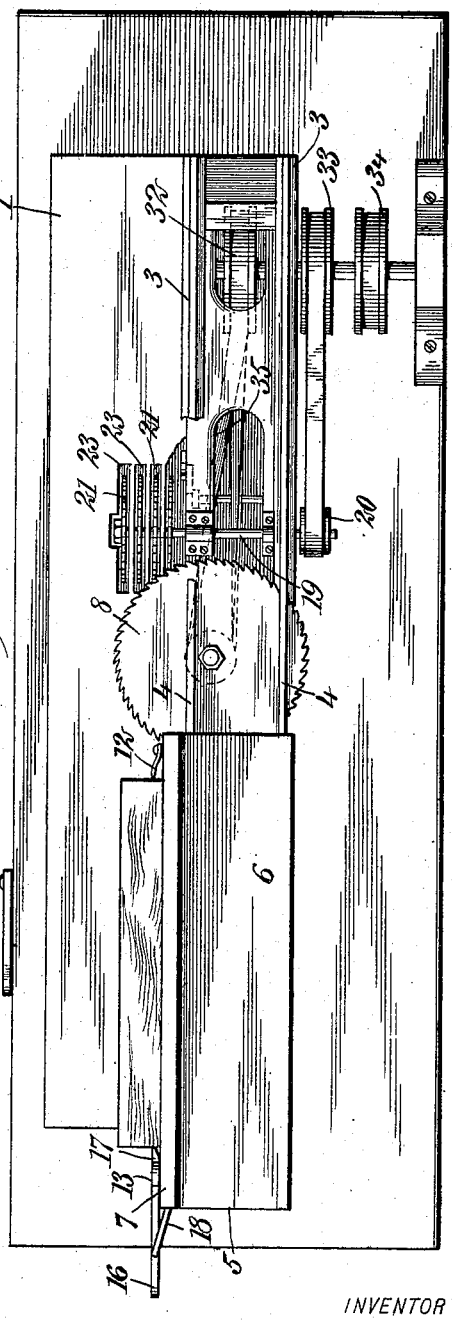
WITNESSES
INVENTOR
Herschel Oldham
BY
ATTORNEYS

UNITED STATES PATENT OFFICE.

HERSCHEL OLDHAM, OF DE LAND, FLORIDA, ASSIGNOR OF ONE-HALF TO BENJAMIN FISH, OF DE LAND, FLORIDA.

LATH-CUTTER.

No. 858,903.  Specification of Letters Patent.  Patented July 2, 1907.

Application filed March 1, 1907. Serial No. 359,972.

*To all whom it may concern:*

Be it known that I, HERSCHEL OLDHAM, a citizen of the United States, and a resident of De Land, in the county of Volusia and State of Florida, have invented a new and Improved Lath-Cutter, of which the following is a full, clear, and exact description.

This invention relates to lath cutters and it is particularly useful in connection with devices of this character intended for cutting stock of irregular shape into laths.

The object of this invention is to provide a simple and efficient lath cutter in which is provided a number of saws arranged in vertical planes, and a single saw arranged in a horizontal plane so that the stock is first cut in a horizontal direction and is subsequently cut vertically into a plurality of laths of proper thickness.

A further object of the invention is to provide a lath cutter in which a movable carriage holds the stock and moves the same into contact with the saws, of which the horizontal one is fixed, while the vertical saws are adjustable in a vertical direction.

The invention consists in the construction and combination of parts to be more fully described hereinafter and particularly set forth in the claims.

Reference is to be had to the accompanying drawings in which

Figure 1 is a side elevation of my lath cutter; Fig. 2 is a similar view taken from the opposite side of the device; Fig. 3 is a plan view showing parts broken away; Fig. 4 is a vertical cross-section; and Fig. 5 is a vertical cross section.

Referring more particularly to the drawings, I provide a table 1 supported in the usual manner by standards 2. Upon the table, in the longitudinal direction thereof, is mounted a pair of carriage supports 3 provided at their upper edges with rails 4. The carriage supports 3 extend a suitable distance above the surface of the table 1. Mounted upon the carriage supports is a carriage 5 comprising a base member 6 and a lateral member 7 extending the full length of the carriage. The lateral member 7 is at substantially right-angles to the base-member 6. A horizontal, circular saw 8 is mounted upon a spindle 9 which extends at right angles to the table and therethrough to the under side. The saw 8 rotates at a suitable distance above the surface of the table within openings 10 provided therefor in the carriage supports 3. At the lower end of the spindle 9 under the table 1 is a pulley 11. The arrangement is such that the saw 8 extends laterally a suitable distance beyond the inner of the table supports and thus, as the carriage is moved along the rails the saw 8 extends beyond the lateral member 7 of the carriage, as appears most clearly in Fig. 3. The lateral member 7 is provided near its forward end with an off-set claw 12 adapted to hold the stock, and at its opposite extremity with a clamp 13 comprising an elbow lever 14 pivoted at one extremity by means of a suitable pivot pin 15, to the member 7, and a handle 16 adapted to jam the opposite end 17 of the elbow lever against the stock to hold the same firmly in engagement with the claw 12 and adjacent to the member 7. A spring 18 is provided to hold the clamp 13 in position while the stock is being worked into laths.

Mounted in suitable bearings in a frame-work 24 underneath the table 1 is a spindle 19 arranged in a substantially horizontal position and provided at its outer extremity with a pulley 20. At its inner extremity is mounted a series of circular saws 21 spaced a suitable distance apart by collars 22 and constituting in the aggregate a gang-saw adapted to cut the stock into suitable lath thicknesses. The table 1 has openings 23 of suitable form to permit the saws 21 to be projected upward therethrough as appears most clearly in Fig. 5. The frame-work 24 carrying the spindle 19 is pivotally mounted at the extremity opposite to the spindle 19 underneath the table 1; as the frame-work is turned about the pivot 25 supporting it, the saws 21 are either projected through the openings 23 or are withdrawn therethrough. An elbow lever 26 is pivotally mounted in any suitable manner underneath the frame-work of the device and carries at one end the pivoted link 27, the opposite end of which is similarly pivoted to the frame-work 24. The other arm of the elbow lever 26 carries a second pivoted link 28 which is secured in the usual manner to a hand lever 29 pivotally mounted adjacent to the frame-work of the device. By means of this hand lever 29 the gang saw can be raised or lowered as desired.

A shaft 30 is mounted in suitable bearings 31 near one end of the lath cutter and carries three pulleys 32, 33, and 34. By means of a belt and the pulley 34, or in any other suitable manner if desired, the shaft 30 is driven to actuate the device. A belt 35 connects the pulley 32 and the pulley 11 on the spindle 9, while a second belt 36 connects the pulley 11 on the spindle 19, and the pulley 33.

The operation of the device is as follows: The stock, which may be of practically any irregular form providing it has one flat face, is mounted against the carriage 5 as shown most clearly in Fig. 3, with a flat face against the lateral member 7, and is held in position by the claw 12 and the clamp 13. The carriage is then propelled forward, and the saw 8 which is at the proper height above the table to cut off a section of the stock equal in thickness to the width of a lath, cuts off from the stock a horizontal section of this thickness. As the stock passes beyond the saw 8 it comes into contact with the gang saw formed by the saws 21, the latter having been projected through the openings 23 by means of the hand lever 29. The gang saw cuts the section separated by the saw 8, into widths of the proper thickness for laths. After passing to its extreme position, the carriage is returned, and the stock is again dropped to the table and clamped in position, whereupon the operation is repeated.

Having thus described my invention I claim as new and desire to secure by Letters Patent:

1. In a lath cutter, a table having an opening, a carriage slidably mounted upon said table and having means at the side thereof for holding stock, a substantially horizontal saw mounted above said table, an adjustable saw mounted underneath said table, and means for projecting said adjustable saw through said opening of said table.

2. In a lath cutter, a table having openings, a carriage slidably mounted upon said table and having means at the side thereof for holding the stock, a substantially horizontal saw mounted above said table, an adjustably pivoted frame-work mounted underneath said table and having a spindle, a plurality of saws rigid upon said spindle, means for projecting said saws through said openings in said table, and means for operating said saws.

3. In a lath cutter, a table, a carriage mounted to move upon said table and having means at the side thereof for holding the stock, a substantially horizontal saw mounted above said table, a spindle pivotally mounted underneath said table, a plurality of saws mounted upon said spindle, said table having openings, and means for projecting said plurality of saws through said openings.

4. In a lath cutter, a table, a saw mounted above said table, a second saw mounted below said table at substantially right angles to said first saw and adapted to be projected above said table, rails above said first saw, a carriage upon said rails and having a lateral member, a claw at one end of said lateral member, an elbow lever at the other end of said lateral member adapted to force the stock against said claw, and a spring upon said carriage adapted to hold said elbow lever in a fixed position.

5. In a lath cutter, a table having rails said rails having openings thereunder, a vertical spindle passing through said table and carrying a saw thereabove and located within said openings under said rails, a spindle adjustably mounted underneath said table and carrying a plurality of saws constituting a gang saw, means for projecting said gang saw through said openings of said table, a carriage upon said rails, and means at the side of said carriage for rigidly holding the stock.

6. In a lath cutter, a table having openings therethrough and rails mounted thereupon with openings under said rails, a vertical spindle carrying a saw above said table in said openings under said rails, and having a pulley underneath said table, a pivoted frame-work underneath said table having a spindle carrying a plurality of saws constituting a gang saw, said spindle further having a pulley, a driving shaft carrying pulleys, belts connecting said pulleys of said spindles and said driving shaft, a carriage upon said rails of said table, and means upon said carriage for holding the stock at the side thereof.

In testimony whereof I have signed my name to this specification in the presence of two subscribing witnesses.

HERSCHEL OLDHAM.

Witnesses:
BEN FISH,
SILAS B. WRIGHT.